United States Patent [19]

Smith et al.

[11] 3,942,594
[45] Mar. 9, 1976

[54] DRILL PIPE MONITORING SYSTEM

[75] Inventors: Hubert Irvin Smith; Fred L. Ott, both of Houston, Tex.

[73] Assignee: Drill-Au-Mation, Inc., Houston, Tex.

[22] Filed: Nov. 11, 1974

[21] Appl. No.: 522,628

Related U.S. Application Data

[62] Division of Ser. No. 294,963, Oct. 4, 1972, Pat. No. 3,866,468.

[52] U.S. Cl. .................. 175/27; 175/85; 175/48
[51] Int. Cl.² ............................ E21B 19/08
[58] Field of Search ............ 175/48, 50, 38, 24, 26, 175/27, 25; 254/173 R; 214/1 P; 173/1–8

[56] References Cited
UNITED STATES PATENTS

| | | | |
|---|---|---|---|
| 3,324,717 | 6/1967 | Brooks et al. ................ | 175/48 X |
| 3,373,823 | 3/1968 | Fullerton et al. ............. | 175/27 X |
| 3,382,713 | 5/1968 | Chutter ........................ | 73/151 |
| 3,593,807 | 7/1971 | Klima .......................... | 175/27 X |
| 3,638,485 | 2/1972 | Knauth ......................... | 73/156 |
| 3,648,783 | 3/1973 | Lackey ......................... | 173/4 |
| 3,740,739 | 6/1973 | Griffin .......................... | 175/48 X |

*Primary Examiner*—Frank L. Abbott
*Assistant Examiner*—Richard E. Favreau
*Attorney, Agent, or Firm*—Donald H. Fidler

[57] ABSTRACT

Disclosed is a system for monitoring the speed at which a pipe string is lowered into or pulled out of a well bore during a well drilling operation. The system includes a unit which derives an electrical signal as a function of instantaneous pipe speed and a monitoring system which compares signals representative of instantaneous velocities with respect to predetermined velocity limits and provides physiological indications whenever such limits are transgressed. Also included are visual indicator means and recorder means, as well as a loop control system for automatic regulation of the speed.

8 Claims, 4 Drawing Figures

U.S. Patent    March 9, 1976    Sheet 1 of 2    3,942,594
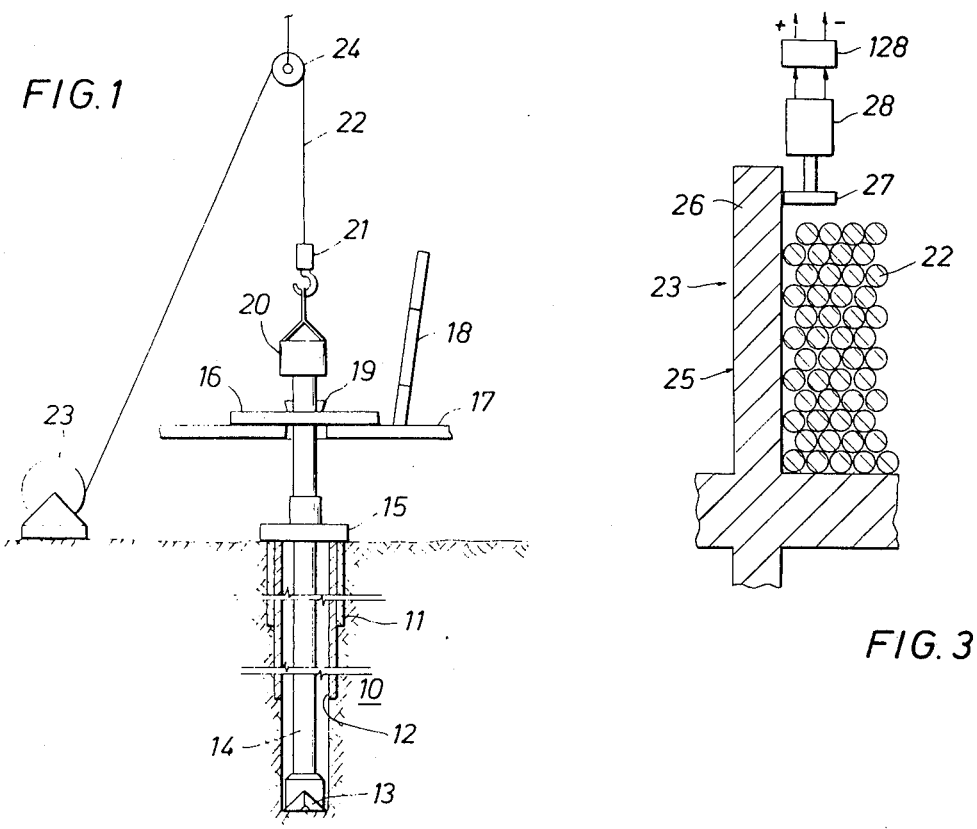
FIG. 1
FIG. 3
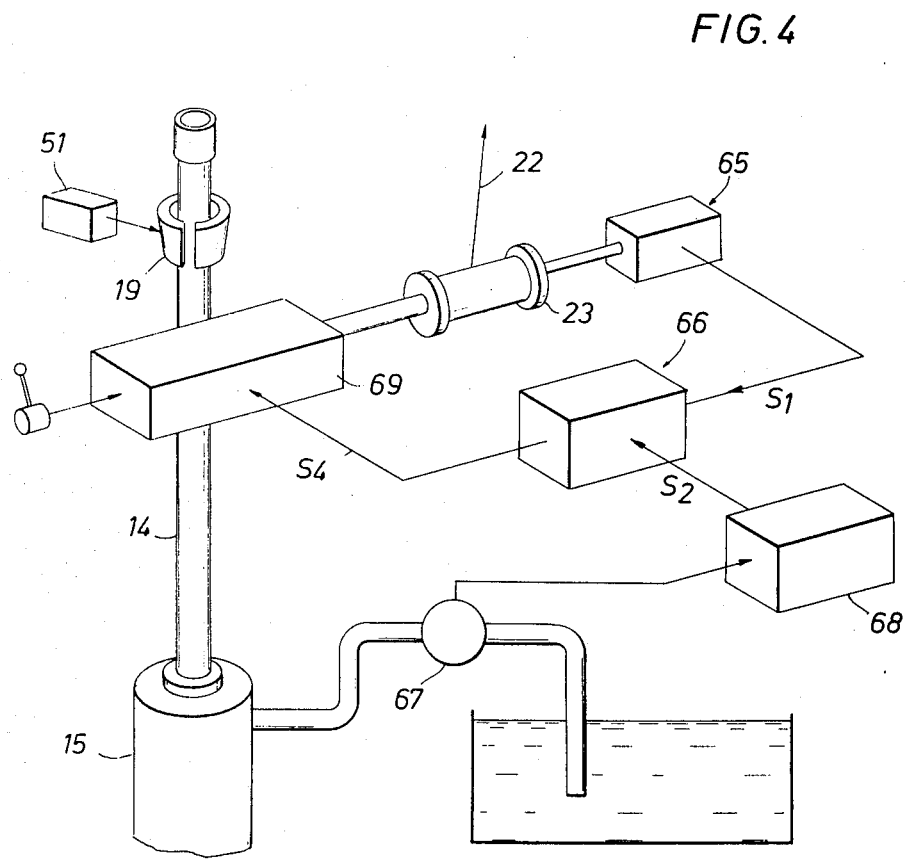
FIG. 4

DRILL PIPE MONITORING SYSTEM

This application is a divisional application of my copending application Ser. No. 294,963, filed Oct. 4, 1972, for "Drill Pipe Monitoring System", now U.S. Pat. No. 3,866,468 issued Feb. 18, 1975.

BACKGROUND OF THE INVENTION

This invention pertains to methods and apparatus for monitoring and deriving indications of the speed at which a pipe string travels while such pipe string is lowered into or pulled out of a well bore during a well drilling operation.

In a rotary well drilling operation, a drilling bit at the end of a drill string or pipe is rotated to cut into the earth formations. The drill string or string of pipe is made up of pipe joints, usually about 30 feet in length, which are coupled to one another by threaded tool joints. As the well is drilled, additional pipe joints are added to the string of pipe.

From time to time during a rotary drilling operation, the drill string or pipe is removed, for example, to change the bit or to perform another operation, such as obtaining a log of the formations. Thereafter, the pipe is returned to continue drilling or to run a string of casing into the hole. The process of removing and reinserting a string of pipe is called "tripping".

In removing or reinserting a pipe string, the pipe joints are successively uncoupled or coupled as the case my be and the sections of pipe or joint sections are stacked in the drilling rig. Usually, pipe joints are interconnected lengths of two or three pipe joint sections, sometimes referred to as "doubles" and "Threbbles" or "pipe stands" when they are vertically stacked in the drilling rig. In this relationship, the pipe joints also are said to be "racked" in the derrick.

The drilling rig has a device called a rotary table which is used to rotate the drilling string. In the rotary table on the derrick floor of the rig are releasable slips which are used to releasably support the pipe string in the borehole during the tripping operation. For example, while going in with a pipe string, the slips serve to hold the upper end of the pipe string in the rotary table and prevent the pipe string from dropping into the well. A vertically movable traveling block in the rig derrick is used to bring a double or threbble pipe length or stand into a position where such a stand can be threadedly coupled to the upper end of the pipe supported in the rotary table. Upon interconnection of a pipe stand to the pipe string, the slips are released and the traveling block supports and lowers the string of pipe into the well bore until the upper end is just above the slips, whereupon the slips in the rotary table are reengaged with the pipe string. This operation is continued until the bit at the lower end of the pipe string is in drilling position. From the time that the pipe string begins its motion from a stop or rest position, it first accelerates to a "running-in" speed which is essentially a constant speed, and then it decelerates to a stopped condition.

Typically, in well drilling operations, a drilling fluid (commonly called "mud") is used where the functions and properties of the drilling fluid are intended to promote a safe and speedy drilling and completion of the well. While the pipe string is being moved into the bore hole or from a bore hole, hydraulic effects or pressure surges relative to the borehole are created which can damage the subsequent productivity of hydrocarbon-bearing formations. Excessive surge pressures can also lead to loss of drilling fluid through pressure induced fractures of the formation which can cause sticking of the drill pipe, excessive loss of mud and other complications.

When the pipe is removed from the borehole, the above described procedure is reversed in that the pipe joints are racked in the derrick as double or triple stands as they are successively uncoupled from the string of pipe. During the pipe removal operation, the motion of the pipe is first an acceleration to a constant speed and then deceleration to a stop condition. While coming out of the borehole, if the string of pipe is pulled too fast while being removed, a condition known as "swabbing" and other undesirable hydraulic effects can occur. Swabbing is a condition involving a reduction in the total hydraulic pressure in the hole to a less than normal pressure for the hydrostatic pressure of the static drilling fluid column in the well bore. An excessive reduction in hydraulic pressure can cause the well to "kick", that is, formation fluids under their in-situ pressures may enter into the drilling fluid and into the well bore. This action could cause a "blow out". In soft formations, collapse of the borehole walls can also occur because of swabbing effects.

Swab and surge pressures can be minimized by reducing the viscosity characteristics of the drilling fluid, providing adequate borehole to pipe clearances, and minimizing flow constrictions in the pipe string. These factors are considered and taken into account when planning the drilling operations for a well. While a round trip of the pipe string is being made, however, these pressures can only be controlled by driller in control of the pipe speed. Commonly, a listing or schedule with optimum velocities in terms of information such as "pull 10 stands at 85 seconds per stand" etc. is available for use by the driller. This schedule can be computed by hand or by a computer. The driller will then attempt to pull or run the pipe string at a uniform velocity by noting the total time required for moving one stand or a joint of pipe over a given distance. However, the drilling cannot give undivided attention to the pipe speed requirements because he must be attentive to the actions of his other crew members in the synchronized operation of moving a pipe string as well as the other equipment under his control.

The schedule, however, cannot always take into consideration miscellaneous factors, which sometime affect velocity, such as the amount of drag on the moving pipe, the position of the hoisting equipment and the behavior of the machinery. Moreover, even if the operation follows the schedule and average speed is within the prescribed limits, it is possible for the instantaneous speeds to be excessive and cause damage.

If the driller simply pulls or runs the pipe very slowly, the hydraulic pressure can be controlled but this is undesirable since it is costly in terms of rig time consumed and furthermore, excessive time periods without mud circulation (as when tripping) may lead to various well difficulties. It should be noted that an optimum velocity varies as a function of the amount of moving pipe in the hole, generaly, but not necessarily, decreasing with increasing lengths of moving pipe.

It should be appreciated from the foregoing that tripping the pipe is a synchronized operation of the drilling crew to move the pipe into or out of the borehole in as short a time as possible, not only to reduce costs but also to reduce the risks involved in not having the pipe in the hole where mud control can be maintained. As noted heretofore, the technology to date for the driller to determine proper run-in or run-out speeds of a string of pipe involves only rudimentary execution procedures based on the elapsed time for moving a section of pipe. A stop watch is sometimes used as the determinant for the velocity, and it will be appreciated that this can only establish average values for velocities. This technique has the very obvious disadvantage that excessive velocities may occur even though the average velocity is kept within limits and the impreciseness of the operation can unknowingly cause well damage.

SUMMARY OF THE PRESENT INVENTION

By means of the present invention a preselected or desired velocity range for moving the pipe can be established and the instantaneous pipe speed monitored relative to the velocity range so that the driller can optimize the speed of the operation while eliminating or minimizing the risks of excessive speeds. This is accomplished by apparatus which includes means for deriving an indication of the instantaneous speed or velocity of the pipe in terms of an electrical signal and means for comparing the electrical signal relative to preset signal values for providing an output indication whenever velocity limits are exceeded. The system is further provided with means for selectively limiting effective operation of the system to movement of the pipe in one direction, and means for dropping out the alarm indicator upon stopping of the pipe.

BRIEF DESCRIPTION OF THE DRAWINGS

The present invention may be more easily understood and will become more apparent from the following description when taken in conjunction with the drawings, in which:

FIG. 1 is a schematic illustration of a drilling system for drilling a well bore;

FIG. 3 is a partial view in cross-section of a drum for a drilling line on a drawworks; and FIG. 4 is a schematic illustration of another type of drilling system control.

DESCRIPTION OF THE PREFERRED EMBODIMENT

Figure 2:
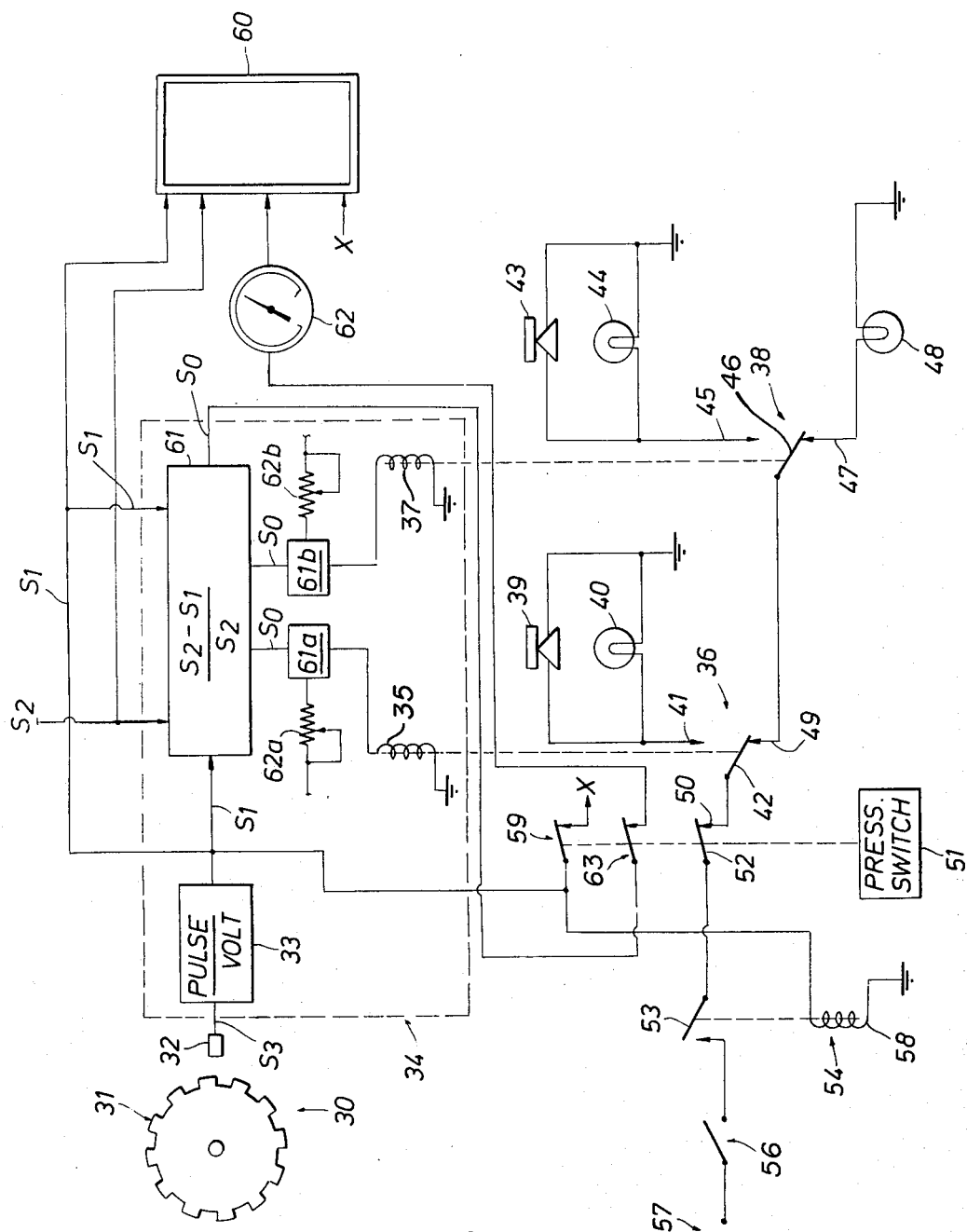
FIG. 2 is an electrical schematic diagram of the system embodying the present invention.

The tripping of a pipe string relative to a well bore should be accomplished in the shortest possible time without causing damage to the well or creating hazardous conditions. With the known parameters of the well, safe maximum velocity values for moving the pipe can be defined. MInimum velocities, of course, do not of themselves create problems, but in the tripping of the well a certain rhythmical operation is developed between the various operators. The judgment of the hoist operator who controls speed of the pipe string is assisted if both the upper and lower velocity limits are defined so that he can maintain an established or defined rhythmical time operation relative to movement of the pipe.

Referring now to FIG. 1, there is shown a well that traverses earth formations 10. The well is illustrated as having surface casing 11 for the first few hundred feet and a protective liner 12 set in place in the next, lower section. The drilling of the well is accomplished by means of a conventional rotary bit 13 attached to a drilling string 14. The drill string 14 extends to the earth's surface where it passes through conventional well head equipment 15 that includes blowout preventers and other well-known equipment. The drill string 14 is rotated by means of a rotary table 16 in a rig derrick 17. On the derrick 17 one threbble section of pipe 18 is illustrated for purposes of explanation. When the pipe string 14 is being pulled from the well bore, slips 19 on the rotary table suspend and support the pipe string in the borehole while the pipe section 18, which is uncoupled from the string, is placed in the pipe rack. In making a trip, elevators 20 are used for latching onto or gripping the pipe string. The elevators 20 are attached to a traveling block 21 which is copuled by a drilling line 22 to a drawworks 23. The drilling line 22 is suspended in the center of the rig near the apex by a crown block 24.

The operation for removing a string of pipe from a well bore starts by the driller releasing the drawworks 23 and lowering the elevators 20 to the derrick floor 17. There the crew (sometimes called roughnecks) latch elevators 20 to the protruding stand of the string of pipe. The driller opens the throttle on the drawworks 23, releases the drawworks brakes, and the drill pipe is on its way up. The driller stops the upward movement of the traveling block 21 when the elevators 20 carry the pipe up to a derrickman positioned above the drilling rig floor and a joint connection is above the table 16. The slips 19 are then set by the crew on the derrick floor and the crew uses tongs to uncoupled a pipe section. Upon disconnection of the pipe section, the bottom of the disconnected stand of pipe is placed on the rig floor while the derrickman swings the top of the stand of pipe into the derrick pipe rack. As soon as the derrickman has control of the upper end of the pipe stand, the elevators 20 are released from the pipe string so that the traveling block 21 and elevators 20 can be lowered at full speed to the rig floor. This operation is repeated until all of the pipe string is removed from the well bore.

For returning the pipe to the well bore, the foregoing described operations are simply reversed. That is, the elevators 20 pick up the upper end of a stand of pipe which is racked in the rig, and the crew couples the stand of pipe to the pipe string supported by the slips 19. The slips 19 are then released and the pipe string lowered into the borehole. When the upper end of the pipe string is just above the rotary table, the slips 19 are again set. The elevators 20 are next released and the traveling block raised to pick up the upper end of another stand of pipe and the operation is repeated.

Referring now to FIG. 2, there is a schematic illustration of a system which includes a sensor 30 for detecting speed from a drawworks and producing electrical signals as a function of the speed. The sensor 30 illustrated involves a tooth gear 31 which can have magnetically susceptible teeth and a pick-up coil 32. The gear 31 can be coupled to the drilling line drum so that the electrical pulse output of pick-up coil 32, as a function of time, is indicative of the speed. The pulse signal $S_3$ is supplied to an electrical tachometer 34 which includes a converter 33. The converter 33 converts the pulse signal $S_3$ to a direct current voltage signal $S_1$ where the level of the signal is a function of the electrical pulse input rate. An alternate embodiment would provide D.C. voltage signal, from a D.C. generator in lieu of pulse device 30 and pulse converter 33. The voltage signal $S_1$ provides one input to a computation circuit 61. The circuit 61 also receives a reference input voltage signal $S_2$ from a voltage source (not shown). The signal $S_2$ provides a preset or preselected electrical signal representative of a desired speed. The computation circuit 61 subtracts the voltage value of the signal $S_1$ from the voltage value for the signal $S_2$ and divides by the voltage value for the signal $S_2$. This computation produces an output signal $S_0$ which is a percentage function of the velocity deviation. This output signal $S_0$ is supplied to an indicating meter 62; thus an indication of how much the velocity deviation is in terms of percentage is defined by meter 61. The voltage signals $S_1$ and $S_2$ are also supplied directly to pens in a recorder 60 for a direct recording of their independent values.

The percentage deviation output signal $S_0$ from the computation circuit 61 also is supplied via the comparator circuits 61A and 61B to the solenoid coils 35 and 37 of the alarm relays 36 and 38. The high and low percentage deviations at which the alarm relays 36 and 38 are energized are individually selectable and adjustable by potentiometer means 62A and 62B. If the detected speed is excessive and the corresponding $S_1$ signal exceeds the $S_2$ signal by the preselected percentage, the relay switch 36 is energized. If the detected speed is too slow and the corresponding $S_1$ signal is less than the $S_2$ signal by the second preselected percentage, the relay switch 38 is energized.

The system for indicating the occurrence of excessive speed includes a first horn and light indicator set where the horn 39 and light 40 are electrically coupled in a parallel relationship. An input for the horn 39 and light 40 is coupled to the normally open contact 41 of the relay switch 36. Thus, when the solenoid coil 35 of the relay is actuated, the relay 36 is operated and electrical power at a movable contact 42 can be applied to the horn 39 and light 40 and result in an indication of the occurence of excessive speed.

A second horn and light indicator set includes a horn 43 and light 44 electrically coupled in a parallel relationship. One input for the horn 43 and the light 44 is coupled to the normally open contact 45 of the relay switch 38. Thus, when the solenoid coil 37 and the relay switch 38 operate, electrical power at a movable contact 46 can be applied to the horn and light set for an indication of too slow speed.

The relay system includes the relay switch 38 which has its movable contact 46 normally closed with a contact 47 coupled to a light means 48 which is grounded. Illumination of the light means 48 is indicative of normal operation within the speed limits. The movable contact 46 of the relay switch 38 is coupled to a stationary contact 49 of the relay switch 36 so that if the velocity is not too great, the movable contact 42 normally closes with the stationary contact 49. The movable contact 42 of the relay switch 36 is coupled to a stationary contact 50 of a pressure responsive switch 51. The pressure responsive switch 51 normally closes a movable contact 52 with the stationary contact 50 when the drill line carries the pipe load and normally opens the contacts 50 and 52 when the traveling block is free of the load. The movable contact 52 is, in turn, coupled to a movable contact 53 of a voltage sensitive relay 54. The stationary contact 55 of the voltage sensitive relay is coupled via an on-off switch 56 to a source of direct current 57.

The electrical output of the converter 33 is coupled to the solenoid coil 58 of the voltage sensitive relay 54 so that when the speed decreases to a low value, the corresponding voltage signal $S_1$ is insufficient to keep the relay actuated and the relay switch will open. The output of the converter 33 is also coupled via a switch contact 59 to the drive system (X) of the recorder 60. Thus, when the pressure switch 51 is operated, the recorder drive is actuated and the strip or other chart in the recorder is moved as a function of time. Also included in the pressure responsive switch 51 are a set of contacts 63 which, when closed, provide electrical continuity between the computation circuit 61 and the meter 62. Thus, meter 62 is operated only when the pressure switch 51 is operated.

In the operation of the foregoing system, the on-off switch 56 is first operated. The drawworks 23 will produce a signal to the converter 33 for either direction of movement and when the speed produces the electrical signal, the voltage sensitive relay 54 is actuated. If the pipe is attached to the line, i.e., there is a load on the drilling line, then the pressure switch 51 will condition the indicator circuits for operation. If there is no load and the empty blocks are traveling between locations, the switch 51 will prevent the indicators from operating.

Assuming a pipe load which is being transported by the traveling block so that switches 54 and 51 are actuated, then power is normally applied from the source 57 through switch 36 and 38 to the indicator light 48. Operation of the light 48 is indicative of a normal operation.

The speed signal $S_1$ from the converter 33 is applied to the recorder 60 and to the computation circuit 61. The computation circuit 61 is supplied with a reference signal $S_2$ which is representative of the desired speed. The alarm comparator circuits 61A and 61B are preset to any desired low or high deviation from the desired speed and whenever the preset values are transgressed either the solenoid coil 35 or the solenoid coil 37 receives a control signal. If solenoid coil 35 is energized because the velocity signal $S_1$ is too low then power from source 57 is applied via the relay switch 36 to the horn 39 and the light 40. On the other hand, if the solenoid coil 37 is energized, then switch 38 applies electrical power from the power source 57 via the switch 38 to the horn 43 and light 44.

It will be readily apparent that while the traveling block is decelerating to a stopped position, this will usually cause the meter to traverse the low velocity limit. To eliminate the nuisance of receiving the audible or visual indications each time that this event occurs, the switch relay 53 is set for a drop out value to disconnect the light and horn sets whenever the signal reaches a predetermined lower value. This value will correspond to a slower average speed used when actually handling the pipe.

The foregoing described system is, of course, susceptible to modifications. the tachometer 34, comprised of converter 33, computation circuit 61, and the alarm comparator circuit 61A and 61B, as described is manufactured and distributed commercially. A differential tachometer which is referred to as dynalco "DT" series can be used and will accept pulse-type inputs. The pressure switch 51 can be applied and used on the drill line, the weight indicator or other suitable and appropriate locations. The signal $S_2$ can be supplied by a computer or by a manually adjustable device. The recorder 60 may be continuously driven on a straight time base. On the footage basis, as illustrated, a variable speed motor in the recorder would be powered by the speed or velocity voltage signal.

In FIG. 3, which is a partial illustration of a drilling line drum of the drawworks 23, there is disposed along a flange 26 of the drum a roller 27 which is attached to a transducer device 28. The rotational motion of the flange 26 through a friction drive rotates the roller 27 and, in turn, transducer 28 produces an electrical output signal as a function of the rotation of roller 27. The rotation of roller 27 and the output signal of transducer 28 is a function of velocity of the drilling line which is a function of the speed of the pipe. Transducer 28 may be constructed and adapted to provide a direct current signal where the polarity is dependent upon the direction of rotation of roller 27, in which case a double pole, double throw polarity reversing switch 128 is necessary to provide a positive input voltage $S_1$. However, switch 128 is not required if transducer 28 provides a non-direction-dependent voltage signal, such as a pulse type signal. The magnitude of the signal from transducer 28, which varies as a function of speed, is affected by the location of the wheel 27 relative to the axis of the drum, the size of wheel 27 and a number of other factors. All of these factors can be electrically compensated so that a signal proportional to the speed or velocity of the drilling line can be obtained. Thus, an analog signal can be derived directly from this type of pick-up or sensor.

Referring now to FIG. 4, a system is illustrated for automatic control. In this system, the speed of the pipe travel is also proportioned from the drawworks 23 which provides a drive of a sensor 65. The sensor 65 is a transducer which provides electrical output signals $S_1$ calibrated in terms of instantaneous pipe speed. The drawworks 23 is powered by an engine means 69 which can be speeded up or slowed down to regulate the pipe speed by means of a throttle control. The throttle control is regulatable and controlled proportionately to an input electrical signal $S_4$. An electrical controller means 66 is provided which is arranged to compare input electrical signals $S_1$ to a preselected reference signal value $S_2$ and provide a compensating control signal $S_4$ whenever $S_1$ and $S_2$ differ by a predetermined value. The reference electrical signal $S_2$ can be generated by a computer means 68 which is suitably programmed to calculate the optimum speed and provide a corresponding electrical signal $S_2$. As a further control measure, a flow meter 67 can be coupled into the mud return line to provide an electrical signal Q which is representative of the flow rate. The Q signal would be used to decrease the $S_2$ signal value in the event the bit becomes clogged with materials in the borehole or should excessive mud line pressures occur for any other reason. Of course, a decrease $S_2$ signal will decrease the speed of the pipe movement.

The foregoing description of the system which involves control of the throttle principally achieves the control of speed while coming out of the hole with the pipe string. While going in the hole, the control signal $S_4$ would be applied to the drawworks brake control systems.

While particular embodiments of the present invention have been shown and described, it is apparent that changes and modifications may be made without departing from this invention in its broader aspects; and, therefor, the aim in the appended claims is to cover all such changes and modifications as fall within the true spirit and scope of this invention.

What is claimed is:

1. A method for control of the speed of pipe relative to a well bore comprising the steps of:
    producing a first electrical signal as a function of the actual speed of the pipe as it moves relative to a well bore,
    producing a second electrical signal as a function of a desired speed value,
    comparing said first and second electrical signals and producing at least one electrical output signal as a function of the pre-established difference between said first and second electrical signals,
    applying said one output signal to a speed control means for the pipe to regulate the speed to a value within said pre-established difference, and
    producing a third electrical signal as a function of the flow rate for the mud system in a well and decreasing the speed of the pipe as a function of any decrease in the flow rate.

2. A method for controlling the speed of pipe as it is moved relative to a well bore comprising the steps of:
    moving a pipe relative to a well bore with a pipe moving means capable of varying the speed at which a pipe is moved,
    sensing the speed at which a pipe is moved relative to a well bore and producing first electrical signals as a function of the actual speed of the pipe,
    producing second electrical signals which are representative of the desired speed at which a pipe should be moved,
    comparing said first and second electrical signals and producing at least one electrical error control output signal as a function of the difference in said first and second electrical signals,
    applying said error control output signal to such pipe moving means to vary the speed at which the pipe is moved toward the desired speed represented by said second electrical signals, and
    sensing the flow rate in a well return line and developing third electrical signals representative of the flow rate in the return line, and
    adjusting the second electrical signals in proportion to said third electrical signals so that the speed at which a pipe is moved is proportional to the flow rate in the return line.

3. Apparatus for control of the speed of pipe relative to a well bore comprising:
    means for moving a pipe relative to a well bore and having speed control means,
    means for producing a first electrical signal as a function of the actual speed of the pipe as it moves relative to a well bore,
    means for producing a second electrical signal as a function of a desired speed value,
    means for comparing said first and second electrical signals and producing at least one electrical ouptut signal as a function of the pre-established difference between said first and second electrical signals,
    means for applying said one output signal to said speed control means for regulating the moving speed to a value within said pre-established difference, and
    means for producing a third electrical signal as a function of the flow rate for the mud system in a well, said last mentioned means being coupled to said means for producing said second electrical signals for changing the speed of the pipe as a function of any change in the flow rate.

4. Apparatus for controlling the speed of pipe as it is moved relative to a well bore comprising:
- pipe moving means for moving a pipe relative to a well bore and including means for varying the speed at which a pipe is moved,
- means for sensing the speed at which a pipe is moved relative to a well bore and for producing first electrical signals as a function of the actual speed of the pipe,
- means for producing second electrical signals which are representative of the desired speed at which a pipe should be moved,
- means for comparing said first and second electrical signals and for producing at least one electrical error control output signal as a function of the differences in said first and second electrical signals,
- means for applying said error control output signal to such pipe moving means for varying the speed at which the pipe is moved toward the desired speed represented by said second electrical signals,
- means for sensing the flow rate in a well return line and for developing third electrical signals representative of the flow rate in the return line, and
- means for adjusting the second electrical signals in proportion to said third electrical signals so that the speed at which a pipe is moved is proportional to the flow rate in the return line.

5. A method for controlling the pipe speed as it is being inserted or removed from a well bore, comprising the steps of:
- moving a pipe relative to a well bore with a pipe moving means having speed control means for varying the speed at which a pipe is moved,
- producing a first electrical signal as a function of the actual speed of the pipe as it is moved vertical relative to a well bore,
- producing a second electrical signal as a function of a desired vertical speed value for the pipe,
- comparing said first and second electrical signals and producing at least one electrical output signal as a function of a pre-established difference between said first and second electrical signals, and
- applying said one output signal to the speed control means to regulate the vertical speed of the pipe moving means to a value within said pre-established difference.

6. A method for controlling the speed of pipe as it is moved vertically into or out of a well bore comprising the steps of:
- moving a pipe vertically relative to a well bore with a pipe moving means capable of varying the speed at which a pipe is vertically moved, sensing the speed at which a pipe is vertically moved relative to a well bore and producing first electrical signals as a function of the actual speed of the pipe,
- producing second electrical signals which are representative of the desired vertical speed at which a pipe should be moved,
- comparing said first and second electrical signals and producing at least one electrical error control output signal as a function of the differences in said first and second electrical signals, and
- applying said error control output signal to such pipe moving means to vary the vertical speed at which the pipe is moved toward the desired speed represented by said second electrical signals.

7. Apparatus for controlling the speed of pipe as it is being moved vertically relative to a well bore comprising:
- means for moving a pipe vertically relative to a well bore and having speed control means,
- means for producing a first electrical signal as a function of the actual speed of the pipe as it is moved vertical relative to a well bore,
- means for producing a second electrical signal as a function of a desired vertical speed value,
- means for comparing said first and second electrical signals and producing at least one electrical output signal as a function of a pre-established difference between said first and second electrical signals, and
- means for applying said one output signal to said speed control means for regulating the vertical moving speed to a value within said pre-established difference.

8. Apparatus for automatically controlling the vertical speed of pipe as it is inserted or removed from a well bore comprising:
- pipe moving means for moving a pipe vertically relative to a well bore and including means for varying the speed at which a pipe is moved vertically,
- means for sensing the speed at which a pipe is moved vertically relative to a well bore and for producing first electrical signals as a function of the actual speed of the pipe,
- means for producing second electrical signals which are representative of the desired vertical speed at which a pipe should be moved,
- means for comparing said first and second electrical signals and for producing at least one electrical error control output signal as a function of the differences in said first and second electrical signals, and
- means for applying said error control output signal to such pipe moving means for varying the vertical speed at which the pipe is moved toward the desired vertical speed represented by said second electrical signals.

* * * * *